Dec. 11, 1962   F. A. PARKER   3,067,560
GAS PURIFIER
Filed Jan. 3, 1961   2 Sheets-Sheet 1
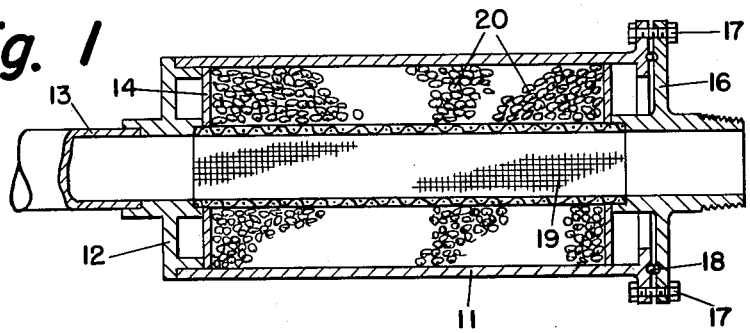
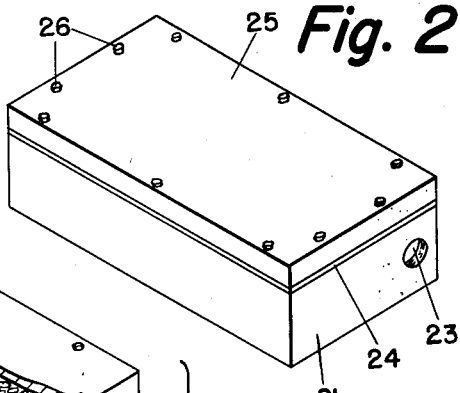
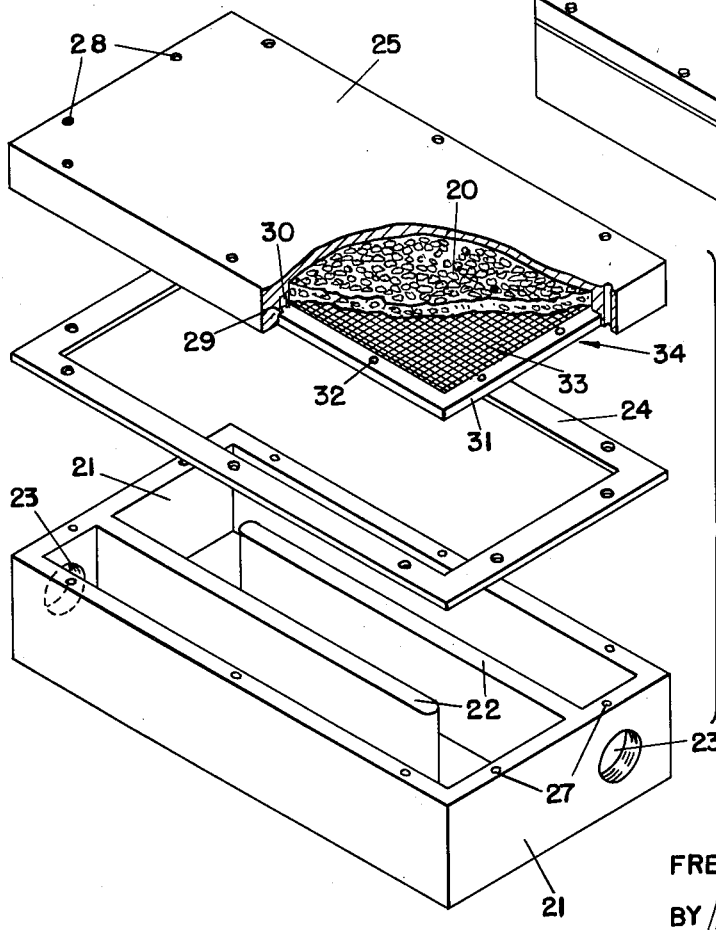
INVENTOR
FREDERICK A. PARKER
BY Henry W. Kaufmann
AGENT

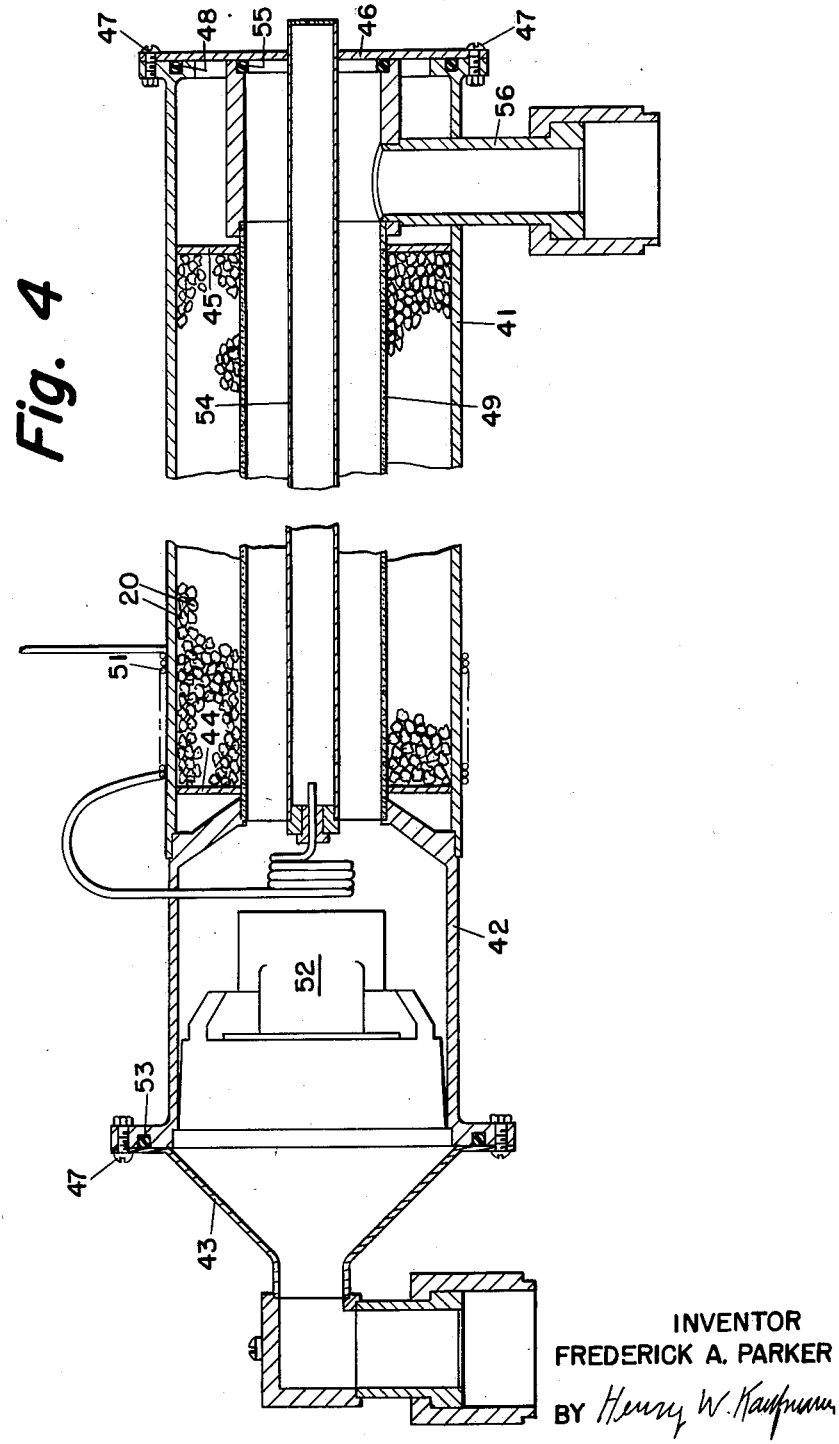

United States Patent Office 3,067,560
Patented Dec. 11, 1962

3,067,560
GAS PURIFIER
Frederick Albert Parker, Broomall, Pa., assignor to General Electric Company, a corporation of New York
Filed Jan. 3, 1961, Ser. No. 80,135
2 Claims. (Cl. 55—269)

This invention pertains to the purification of gases, and in particular to means and methods of purifying gases by absorption of impurities therefrom.

Transporting living animals through a markedly lethal environment, such as the depths of the sea, or interplanetary space, requires that they be provided with an artificial environment, usually a hermetically sealed container, whose ambient atmosphere is maintained at pressures, temperatures, and compositions tolerable to the animals. Since the animals consume oxygen and excrete carbon dioxide in living, it is necessary to replace consumed oxygen, which is a simple matter of releasing oxygen from whatever source, and to remove carbon dioxide. Carbon dioxide in excess has undesirable physiological effects, and even if it did not, maintenance of oxygen content of the atmosphere by addition with no removal of carbon dioxide would ultimately raise the pressure beyond tolerable bounds.

The previously used method of removing carbon dioxide and other undesired gases was to pump the ambient atmosphere through a bed of permeable absorbent material. This has several undesirable features. The pressure drop through such a conventional filter or absorber bed is sufficient to constitute a more than negligible addition to the power requirements of the container or vessel. In space travel, where the cost of each pound of payload is, both literally and figuratively, astronomical, any avoidable increase in power supply weight is intolerable. Also, many absorption reactions as used in carbon dioxide absorbers are exothermic, so that it is necessary to provide for cooling the absorber or the stream of gas which has passed through it which, because of its intimate contact with the absorbent where the heat is generated, absorbs much of the heat. This places additional load on the refrigerating system, and the power supply which drives it. To these two faults is added a useless virtue. The absorbent bed produces a nearly complete removal of the undesired gases, which is of very little value, since the human animal, in particular, can tolerate moderately high concentrations and fluctuations in concentration of carbon dioxide.

Since animals evaporate water, and function better if the humidity is kept within certain limits, so that this evaporation may occur at customary rates, it is usually necessary to remove some of the water vapor content of the atmosphere as part of the purification process. The use of hygroscopic components in the materials of filter beds, which was a prior art method of removing water vapor, usually removed, when the filter charge was fresh, far too much of the water vapor, so that the humidity was reduced more than was desired, and it was necessary either to tolerate less than the desired humidity, or to restore some of the humidity—a very wasteful process. Also, since most actively hygroscopic materials tend also to deliquesce, a real problem existed of maintaining the hygroscopic materials in the filter bed after they had become fluid. There are certain hydrates which tend to maintain constant vapor pressure over themselves (cf. The Handbook of Chemistry and Physics, Twenty-First Edition, edited by C. D. Hodgman, published by the Chemical Rubber Publishing Company, Cleveland, Ohio, pages 1412–1413) but these have relatively low water absorption capacity per unit of their own weight, and are highly impractical for uses where weight and bulk must be minimized.

My invention, in effect, trades the useless virtue of the older art in exchange for the elimination of its defects. Instead of the series or cascade type of filter, I teach the use of a parallel filter. In one embodiment this consists of a porous tube, which may be of sintered metal, which is filled with (or surrounded by) absorbent material; and the atmosphere to be purified is passed around (or through) the tube, casual diffusion of the impurities (including water vapor) through the walls and into the absorbent being sufficient to produce a reduction in the impurity concentration. This is essentially a parallel filter, somewhat similar to the bypass type of oil filter used in automobile engines. There is, however, a distinct difference between the two, in that the by-pass oil filter takes a part of the total oil circulation and forces all of that part—oil and impurities—through the oil filter. A filter system in accordance with my invention, on the other hand, is what might be described as "self-pumping" in that absorption of the impurities by the absorbent reduces the partial pressure of the impurities and also the total gas pressure adajcent to the absorbent, promoting further diffusion of undesired components through the porous tube and into the absorbent. Thus there is a selective action which tends to bring impurities to the absorbent in greater proportions than the remainder of the ambient atmosphere is brought to it.

A gas filter according to my invention is adapted to very convenient cooling of the absorbent, to remove the heat of the exothermic reactions mentioned hereinabove. The structure exposes only one side of the absorbent to the gas flow, and the other side may be cooled to remove heat without passage through the flowing gas. In particular, if the closed vessel whose atmosphere is to be controlled is in surroundings of low temperature, the absorbent material may be located in a tubular jacket around an internal porous tube through whose inner portion the air to be purified is passed. The entire purifier may be located outside of the vessel, so that the jacket in contact with the absorbent is exposed directly to the low-temperature surroundings. The heat produced in the absorbent will then be carried off into the outside environment, with relatively little effect upon the temperature of the air passing through the inner porous tube, and a consequent marked reduction of the load upon the equipment which adjusts the temperature of the air in the vessel.

It is thus evident from the preceding that my invention achieves numerous objects all desirable in themselves, and all particularly useful in producing a filter for assisting in controlling the ambient atmosphere composition in a space vehicle, or for other applications having some similar requirements.

For the better explanation and understanding of my invention I have provided figures of drawing, in which:

FIG. 1 represents in central section an absorber in accordance with a first embodiment of my invention which is preferred for some applications, and FIG. 2 represents, pictorially, another embodiment of an absorber in accordance with my invention, and FIG. 3 represents, pictorially and partially in section, a disassembled or exploded view of the component parts of the embodiment represented in FIG. 2.

FIG. 4 represents a particular embodiment including a fan or blower and an internal cooling element for cooling the air directly.

In FIG. 1, there is represented a section on a plane through the central axis of circular cylindrical symmetry of an absorber whose principal housing 11 is sweated or welded or otherwise hermetically sealed to an end fitting 12, which is provided with an internal opening having internal shoulders at both sides. One of these shoulders (not designated) is adapted to abut the end of a conduit or tube 13, which is sealed hermetically to fitting 12 by some permanent means, such as sweating or welding. The other shouldered part of fitting 12, represented at the right side of the fitting in FIG. 1, is adapted to receive porous tube 19, which is not required to be sealed to fitting 12, but merely rests in it. Tube 19 is a hollow circular cylinder, conveniently formed by wrapping flexible sheet around a mandrel and forming a seam by welding the mating edges of the sheet. It is required to be porous, but to have holes sufficiently small to retain absorbent particles and, preferably, to retain by surface tension even small droplets of liquid if these should be formed by hygroscopic absorbent materials through water absorption. A material which has been found satisfactory for this purpose is sold in commerce under the trade name Rigimesh "J" by Aircraft Porous Media, of Glen Cove, Long Island, New York, a division of the Pall Company. It is formed of stainless steel wire mesh, type 304 or 316 of the American Iron and Steel Institute, either 60 x 60 meshes per inch or 70 by 70 meshes per inch. Multiple layers of such mesh are pressed together and sintered to form a porous material suitable to filter out particles down to 10 microns in size, and of such porosity that, with a pressure difference of one inch of mercury between opposite sides of the sheet, air at standard temperature and pressure will flow through it at a rate of at least 4.5 cubic feet per minute per square inch. (This somewhat curious commercial unit of 4.5 cubic feet per minute per square inch corresponds to an effective velocity of about 650 feet per minute normal to the surface of the material; actual velocity through the much smaller area of the orifices themselves is, presumably, much higher.) Between porous tube 19 and housing 11 are placed granules of absorbent 20, whose composition will naturally depend upon the gases or vapors to be absorbed. These particles 20 are retained by gasket 14, which rests against end fitting 12, and by gasket 15, which is placed around tube 19 and retained in place by flanged fitting 16. Ftting 16 has a central opening which is shouldered on the left (as represented) to receive tube 19 and has a male protuberance, threaded, on the right as represented. Its flange is adapted to mate with the flanged end of housing 11, an O-shaped gasket 18 being fitted in grooves provided therefor in 11 and in 16, to produce a gas-tight seal when fitting 16 and housing 11 are forced together by the tightening of fastening means 17, here represented as bolts with nuts. It is evident that air may flow in through conduit 13, through fitting 12 and thence through tube 19 to exit through fitting 16 to a further conduit (not here represented) which may be screwed to the threaded protuberance of fitting 16; and in its passage the air will be exposed to the surface of tube 19, but will not be forced through any constriction appreciably smaller than the internal section of conduit 13.

Consideration of the structure represented in FIG. 1 will reveal that (a) it is hermetically sealed with respect to the outside environment, except where provision is made for hermetic connection of conduits; (b) it permits substantially unrestricted flow of air through the structure, as described supra; (c) a direct heat flow path exists from the absorbent 20 through the wall of housing 11 to the outside environment. Heat generated in absorbent 20 may therefore be removed by placing the entire assembly outside the volume whose internal atmosphere is to be controlled as to composition and temperature. In practice, the assembly represented in FIG. 1 may be located outside the life chamber of a space vehicle, or externally to the life space in a submarine, so that heat developed in absorbent 20 may be removed with relatively little effect upon the temperature of the air which passes through the central channel of the entire apparatus. If the external ambient temperature should be excessively low, so that the temperature of absorbent 20 is reduced (for example) to a temperature so low as to affect its operation in some undesired manner, external housing 11 may, of course, be lagged with a suitable thickness of thermal insulation.

The materials for the embodiment of FIG. 1 may, for most applications, be of metal (except for absorbent 20), the exact choice being dependent upon weight allowance, pressure difference between the inside and outside, and the possibly corrosive nature of the absorbent 20. Stainless ferrous alloys, of the general chrome-nickel category well known in the mechanical art, are suitable, except for the gasket 18, which would conventionally be of some softer material such as lead. Lithium hydroxide has been found satisfactory for absorbing carbon dioxide (lithium being chosen because of its low equivalent weight) and lithium chloride functions satisfactorily to absorb water vapor. Activated carbon is ordinarily added to absorb other miscellaneous gases which may be produced. The relative proportions of lithium hydroxide and chloride to be employed depend upon the exact operating conditions, including the proportions of carbon dioxide and water vapor evolved in the atmosphere which is to be purified. The calculation of suitable proportions is well within the known chemical art.

FIG. 2 represents an alternative embodiment of my invention, having the general form of a rectangular box rather than of a circular cylinder as represented in FIG. 1. The outer case 21 (represented in detail in FIG. 1) is provided with partitions or baffles 22 extending partly along its longest dimension and of the same height as the outer walls of case 21, so that, when a flat cover is placed over case 21, a Z-shaped passage extends from one internally threaded hole 23 between case 21 and baffle 22, thence between the two baffles 22, and thence between case 21 and the second baffle 22 to the second tapped hole 23. The outer walls of case 21 are represented as provided with internally threaded blind holes 27 for the reception of cap screws 26, which serve to fasten cover 25 as a cover to case 21, gasket 24 (shown in detail in FIG. 3) being provided between the mating faces to furnish a pressure tight seal. As FIG. 3 represents in detail, cover 25 has a central recessed portion 29 surrounded by a narrow shoulder which lies slightly below the outer boundary of 25. This shoulder is provided with tapped holes 30, and is adapted to receive assembly 34, as represented. Assembly 34 consists chiefly of a flat sheet 33 of gas-permeable porous wall material of the same nature as that forming porous sleeve 19 of FIG. 1. Porous sheet 33 is welded or otherwise fastened to a rim 31, which is provided with holes 32, located to overlie the holes 30 in the shoulder of cover 25, so that assembly 34 may be fastened in place in cover 25 to retain in place absorbent 20, which is placed in the hollow central part of cover 25, as represented in the cutaway portion of FIG. 3. It is evident from an inspection of FIG. 2 that, when the parts of the assembly are brought together as indicated by the dash lines, gas flowing from one opening 23 to the other opening 23 will be exposed, in its passages around the baffles 22, to the surface of porous sheet 33, and will have an opportunity to diffuse through its porosities into contact with absorbent 20. It is evident that the pressure drop involved in passage through the assembly represented in FIG. 2 will be small, and that the absorption of impurities will produce a kind of automatic pumping action as described in connection with the embodiment represented in FIG. 1. What has changed is the particular physical embodiment of my invention, not its manner of operation. Remarks concerning the choice of material for the various parts of the embodiment of FIG. 1 are applicable also to the embodiment represented in FIG. 2.

Obviously many geometrical variations in arrangement, in modes of connection of the input and exit conduits, in the provision for opening the housing to replace exhausted absorbents, and other minor parameters are possible within the scope of this disclosure.

FIG. 4 illustrates an embodiment of my invention which was employed in an application where it was desired to conserve space as much as possible, even to the extent of including in the purifier means for cooling the air, and means for propelling the air through the purifier. Since there is a considerable analogy of structure between the embodiment of FIG. 4 and that of FIG. 1, analogous parts represented in FIG. 4 will be given reference numbers identical in the least significant digit; thus the analogue of housing 11 will be designated 41. Parts represented in FIG. 4 which have no obvious analogue in FIG. 1 will, of course, not be amenable to this plan and will be numbered serially.

Considering first the parts analogous as above described, housing 41, analogous with 11, is hermetically sealed to end fitting 42, analogous with 12, but elaborated in that it is adapted to receive and support axial blower 52, having no analogue in the representation of FIG. 1, and that it is provided with central radial pieces to support one end of cooling tube assembly 54, which is adapted to receive evaporant refrigerant through capillary tube 51 fastened as indicated to housing 41, the source of refrigerant supply being external to the figure and not indicated. Cooling tube assembly 54 and capillary 51 have no analogues in FIG. 1; and they are not represented in any great detail because the general heat removing structure of 54 and the use of a capillary as a substitute for an expansion valve are very well known in the art of refrigeration. It is intended to emphasize here the relative independence of the air cooling means from the heat-evolving absorbent. Heat evolved in absorbent 20 may be very largely removed through housing 41, while the air flowing through the interior of porous tube 49, analogous with 19, is affected relatively little by the heat evolution in absorbent 20, and may be cooled as required by coolant in assembly 54. In the light of the described functions of axial blower 52 and cooling tube assembly, certain differences in structure between the embodiment of FIG. 1 and that of FIG. 4 should now be more readily understandable. The conical cap 43 is only remotely analogous with conduit 13, because it is represented as flanged and hermetically secured by gasket 53 to end fitting 42, being held firmly in place by fastening means 47 (which may conveniently be bolts with nuts). Cap 43 is thus represented in order to disclose a structure in which axial blower 52 may readily be installed and serviced. Cap 43 may be connected to any convenient conduit means for input. Baffles 44 and 45 are completely analogous with baffles 14 and 15; but end plate 46 is similar only in general function to flanged fitting 16. The inclusion in the embodiment of FIG. 4 of the cooling tube assembly 54 necessitates the provision of an exit for the refrigerant. Therefore cooling tube assembly 54 passes through a hole in end plate 46, being hermetically sealed to it by welding or other known convenient means. The effluent air passes out of end assembly 56 (which has no particular analogue in FIG. 1) through a tubulation extending downward in FIG. 4, where it is represented as part of assembly 56, since it must, however formed, be hermetically connected with the remainder of 56. It is also hermetically sealed by convenient means, such as welding, to housing 41 at its passage therethrough. End plate 46 is represented as sealed to housing 41 by gasket 48, analogous with 18, and held in place by fastening means 47, analogous with 17. It is, however, also hermetically sealed to assembly 56 by gasket 55. Because the known means of connecting conduit means to structures such as cap 43 and assembly 56 are numerous, including various varieties of tubing connectors, unions, flanged couplings, and many other well known devices, they are not discussed in detail, as being obvious to those possessing even rudimentary skill in the art.

The structure represented in FIG. 4 has been found actually useful in a particular application, for which it was preferred. It represents some of the advantages of compactness and inclusion of auxiliary devices within the general structure of a purifier, to which my invention lends itself very well. Its peculiarly specialized nature may be considered to keep it from deserving designation as the generally preferred embodiment of my invention, but rather as an example of the great flexibility of embodiment which my invention permits, which must necessarily result in different embodiments which are preferred for different applications, all being representative of the teachings of my invention.

What is claimed is:
1. A device for reducing the concentration of gaseous impurities in a gaseous fluid, comprising:
   a gas-impervious cylindrical outer housing;
   a porous tube located inside the said outer housing and substantially coaxial therewith;
   solid absorbent material for absorbing the said gaseous impurities with evolution of heat, located between the said outer housing and the said porous tube;
   gas-impervious closure means extending between the said outer housing and the said porous tube to retain the said solid absorbent material therebetween;
   a gas-impervious tube located inside and coaxial with the said porous tube, not in contact therewith, and provided with inlet means and an outlet for the flow of heat-conveying fluid through the said gas-impervious tube; and
   inlet and outlet means communicating with the ends of the said porous tube and adapted to conduct a flow of the said gaseous fluid therethrough.
2. A device for reducing the concentration of gaseous impurities in a gaseous fluid, comprising:
   a gas-impervious outer housing;
   a porous barrier located adjacent the said outer housing to form a space in which there is located
   solid absorbent material for absorbing the said impurities with evolution of heat;
   gas-impervious closure means extending between the said outer housing and the said porous barrier to retain the said solid absorbent material therebetween;
   gas-impervious heat-transmitting means located adjacent to said porous barrier to form a passage for flow of the said gaseous fluid between the said heat-transmitting means and the said porous barrier, and provided with inlet means and an outlet for the flow of heat-conveying fluid in contact with the said heat-transmitting means but separated by the said heat-transmitting means from contact with the said gaseous fluid; and
   inlet and outlet means communicating with the said passage for flow of said gaseous fluid between the said heat-transmitting means and the said porous barrier, adapted to conduct a flow of the said gaseous fluid through the said passage.

References Cited in the file of this patent
UNITED STATES PATENTS

| | | |
|---|---|---|
| 1,561,650 | Lashar | Nov. 17, 1925 |
| 2,001,828 | Smith | May 21, 1935 |
| 2,671,526 | Hunt et al. | Mar. 9, 1954 |
| 2,680,355 | Colomb | June 8, 1954 |
| 2,924,630 | Fleck et al. | Feb. 9, 1960 |